3,300,268
MEANS FOR ELIMINATING INTERFERING DIFFRACTION EFFECTS ORIGINATING AT THE EDGES OF A MIRROR

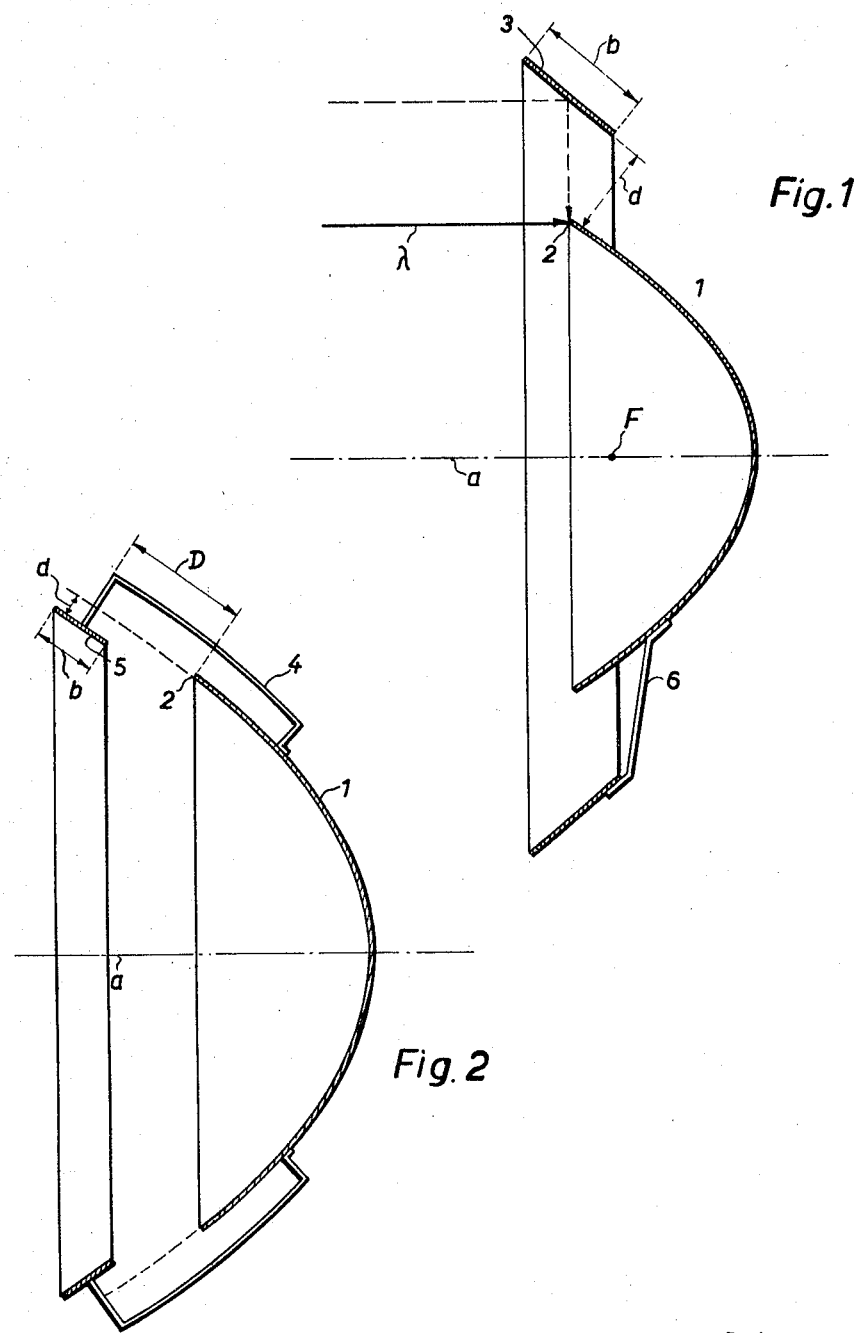

Lothar Straub, 41 Gartenstrasse, Tubingen, Germany
Filed Dec. 10, 1962, Ser. No. 243,232
Claims priority, application Switzerland, Mar. 22, 1962, 3,441/62
4 Claims. (Cl. 350—296)

This invention relates to method and means for the elimination of interfering diffraction effects on representations produced by waves.

It is known that interfering effects are produced in image representations transmitted by waves, particularly in the marginal zones thereof, owing to diffraction on intermediary media situated between wave source and image reproduction. It is obvious to attribute such effects to disturbing diffraction waves whereby it simultaneously is maintained that such disturbing effects in principle may be avoided by excluding these interfering waves. A means, known per se, for the removal of waves is the expedient of eliminating them by interference. It is an object of the present invention to provide a method for elimination of interfering diffraction effects, which consists in superposing a coherent wave train in dephased condition on the disturbing diffraction wave close to the point of origin thereof.

The invention proposes two practical means for producing the dephased wave train. On the one hand, the opposed phase wave train may be produced by deflecting a wave part by means of mirrors, whereby the interfering wave is eliminated so to say by a double illumination of the point producing the disturbing diffraction effect. On the other hand, the same result may also be obtained by a double or multiple diffraction.

Another object of my invention is the provision of apparatus for carrying out the above mentioned method. This apparatus comprises means associated with the interfering source and arranged for producing a coherent dephased superposed wave.

The method according to the invention will now be explained in more detail with reference to the accompanying drawings diagrammatically illustrating, by way of example, the principle of my invention.

In the drawings:

FIGURE 1 shows a first embodiment associated with a parabolic mirror, using double illumination, and FIGURE 2 illustrates a second embodiment associated with a parabolic mirror, using double diffraction.

In the example according to FIGURE 1 a parabolic mirror 1 has a marginal edge portion 2 which produces the interfering diffraction effect. The main wave train impinging on the parabolic mirror 1 is assumed to have the wave length λ. The edge portion 2 of the parabolic mirror 1 is surrounded by an annular mirror 3 of larger diameter than that of the edge portion 2 of the parabola. The ring 3 of the parabolic mirror has the shape of a cone surface section, and its arrangement is selected so that the coherent wave impinging together with the main wave train upon the ring 3 is reflected towards the mirror edge portion 2 in such a manner that said wave appears there with a phase difference of λ/2 with respect to the main wave train, or an odd multiple thereof. The expression main wave train is used to designate that train which hits without obstacle the surface of the parabolic mirror. The portion of the main wave train impinging upon the edge 2, which portion, due to the diffraction wave produced on the edge, acts interferingly and does not contribute to the correct display or representation, is reduced or extinguished owing to interference by the dephased wave train arriving from the ring 3. In practically carrying out this elimination of the disturbing wave owing to interference by means of a coherent dephased auxiliary wave emanating from the ring 3, the correct proportioning of the individual elements has to be taken into account, in order to obtain best results. Practical tests have shown, that the width b of the ring 3 should approximately be equal to between 2 and 5λ while the distance d of the ring 3 from the edge 2 of the parabolic mirror may vary between 1 and 5λ/2; the value d suitably is selected small, so as to remain within the tolerance for a λ-zone.

The ring 3 is suitably supported by means of strutting members 6 on the parabolic mirror.

The described double-illumination method may be applied when using waves serving for the purpose of representation or forming an image and having different wavelengths, thus for instance for radar units, X-ray apparatus, telescopes, microscopes, interferometers, sound apparatus and other devices. The deflection for providing the double illumination can be obtained by reflection refraction or diffraction. The method naturally may also be applied in the case when the wave train is not incident with respect to the mirror (receiver), as assumed in FIGURE 1, but is radiated from the mirror (transmitter).

FIGURE 2 shows a parabolic mirror 1 having again a marginal edge portion 2. The edge 2 of the mirror need not necessarily be round. When a wave train impinges upon the marginal edge portion 2, interfering diffraction effects are produced, as mentioned above. In the present case these interfering diffraction effects are avoided by double diffraction. For this purpose a ring member 5 is mounted on the parabolic mirror 1 by means of strutting members 4. The ring member is disposed in front of the paraboloid surface of the mirror (but could also be situated behind this surface) and is axially spaced or staggered from the mirror edge 2, while coaxially surrounding the axis of the mirror. Two or more such ring members 5 may also be provided, in order to obtain a multiple diffraction. The ring member has the shape of a cone surface section and forms a diffraction band. A diffracted wave train having a wave length corresponding to that of the wave train hitting the parabolic mirror on the edge 2 thereof, is subjected, upon diffraction, to a phase displacement of λ/2, or 3/2λ or 5/2λ, etc. on the ring 5, due to the offset position of the latter, so that the effects of the two diffractions compensate each other in predetermined directions; the interfering wave may thereby be changed so as to lose its disturbing character.

In the actual construction of this apparatus a band made of the same material as the mirror 1, e.g., of steel suitably is employed for the ring 5; this band may be provided with a suitable absorption coating, e.g., of synthetic material or plastics. Tests have proved that good result will be obtained when the width b of the ring 5 is approximately 0.9 to 1.1λ, and when the spacing d of the ring 5 from the paraboloidal surface of the mirror is λ/4 and the distance D of the ring centre from the mirror edge 2 amounts to a multiple of λ.

Also in light optics, the problems of image formation are determined by wave diffraction and may be influenced in analogous manner.

Thus, e.g., double diffraction may be applied on an aperture diaphragm of a telescope.

Dioptrically, it is for instance possible to change the diffraction of the diaphragm by adding a suitably proportioned transparent foil which produces an additional diffraction wave as phase stage, in the same manner as the described diffraction band.

The microscopic object diffraction is suitably influenced by monochromatic double illumination; at object point in interference minima the diffraction is compensated or annulled and the object is projected accordingly.

I claim:

1. Apparatus for improving the fidelity of images transmitted by waves along an optical axis and passing through the aperture of image-forming means of a wave transmitting system and with equal intensity over the entire area of the aperture, by eliminating or reducing the diffraction effects, adversely affecting the fidelity of the transmitting system and caused by diffracted waves originating at the edges of an aperture, said apparatus comprising, in combination, image producing means having a wave transmitting aperture on said optical axis; a wave deflecting band positioned symmetrically relative to the optical axis and in operative relation with the edges of the aperture; the axial spacing of said band from the aperture and the direction of wave deflection thereof relative to the aperture being such as to produce, from the transmitted waves, coherent compensating waves displaced in phase relative to the diffracted waves by an odd multiple of one half the wave length ($\lambda$) of the diffracted waves and to direct said coherent phase-displaced compensating waves in a direction such as to superpose the latter on said diffracted waves substantially at the point of origin of the latter; the image producing means being a parabolic mirror having an interfering diffraction producing edge, said wave deflecting band being formed by an annular member arranged coaxially with the mirror and having a width from 2 to 5$\lambda$, the distance of said annular wave deflecting band from the paraboloidal surface of the mirror being between $+\lambda/2$ and $5\lambda/2$.

2. Apparatus according to claim 1, in which said wave deflecting band has an annular deflection surface in the shape of a conoid surface.

3. Apparatus for improving the fidelity of images transmitted by waves along an optical axis and passing through the aperture of image-forming means of a wave transmitting system, and with equal intensity over the entire area of the aperture, by eliminating or reducing diffraction effects, adversely affecting the fidelity of the transmitting system and caused by diffracted waves originating at the edges of an aperture, said apparatus comprising, in combination, image producing means having a wave transmitting aperture on said optical axis; a wave deflecting band positioned symmetrically relative to the optical axis and in operative relation with the edges of the aperture; the axial spacing of said band from the aperture and the direction of wave deflection thereof relative to the aperture being such as to produce, from the transmitted waves, coherent compensating waves displaced in phase relative to the diffracted waves, by an odd multiple of one half the wave length ($\lambda$) of the diffracted waves and to direct said coherent, phase-displaced compensating waves in a direction such as to superpose the latter on said diffracted waves substantially at the point of origin of the latter; the image producing means being a parabolic mirror having an interfering diffraction producing edge; said wave deflecting band being formed by an annular member arranged coaxially with the mirror and the width of the annular wave deflecting band being substantially situated between 0.9 and 1.1$\lambda$, while the distance D of the band from the edge of the mirror is a multiple of $\lambda$, and the distance of the band from the paraboloidal surface of the mirror is $\lambda/4$.

4. Apparatus according to claim 3, in which said wave deflecting band has an annular deflection surface in the shape of a conoid surface.

References Cited by the Examiner

UNITED STATES PATENTS 3,045,530   7/1962   Tsujiuchi _____ 88—106 X

FOREIGN PATENTS 150,702   3/1953   Australia.
800,466   8/1958   Great Britain.

JEWELL H. PEDERSEN, *Primary Examiner.*

J. K. CORBIN, *Assistant Examiner.*